July 1, 1958 J. FRASER 2,841,191
LIQUID DISPENSING APPARATUS
Filed May 21, 1957 4 Sheets-Sheet 1

INVENTOR
JOHN FRASER
BY
ATTORNEY

INVENTOR
JOHN FRASER
BY
ATTORNEY

July 1, 1958
J. FRASER
2,841,191
LIQUID DISPENSING APPARATUS
Filed May 21, 1957
4 Sheets-Sheet 4
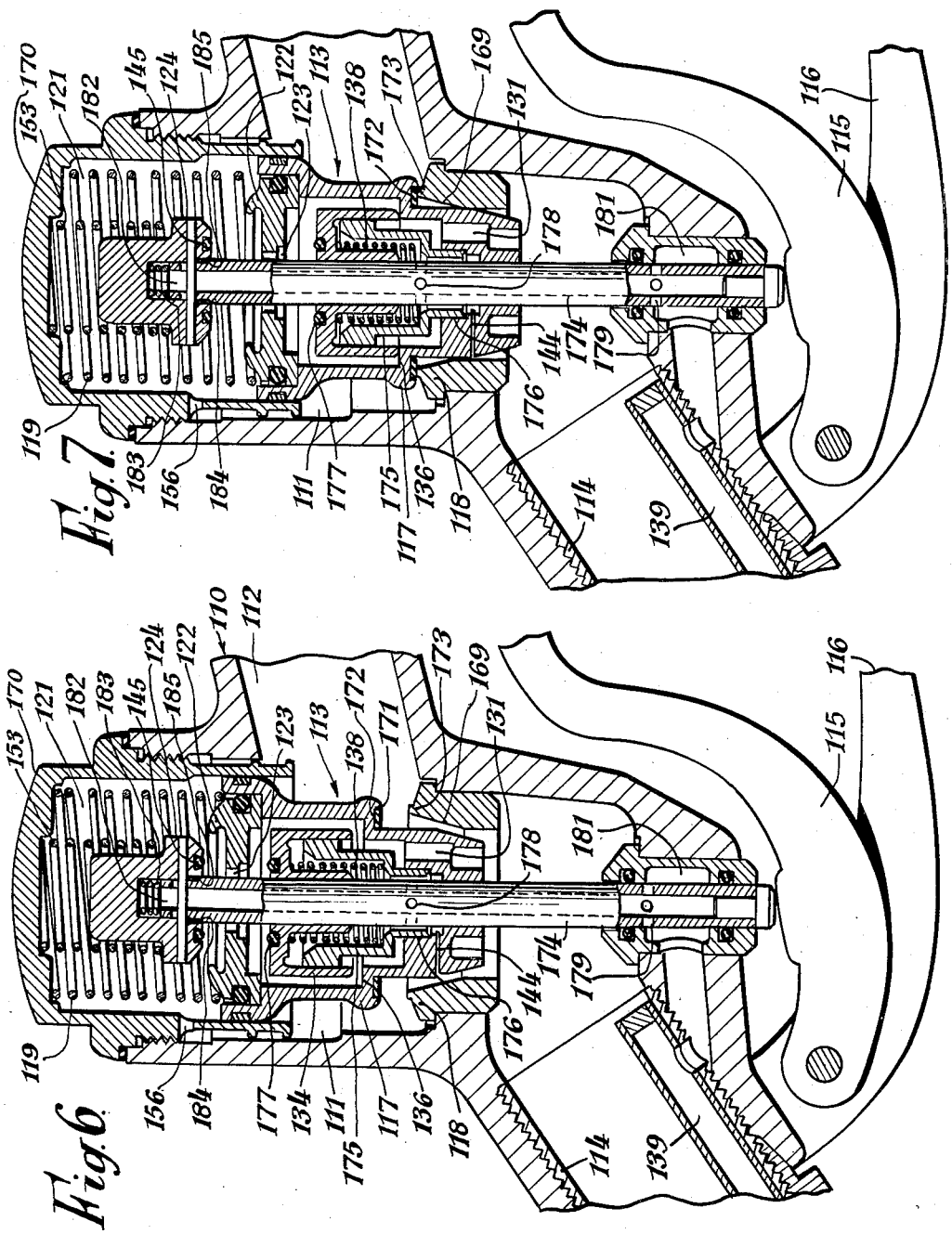
INVENTOR
JOHN FRASER

United States Patent Office 2,841,191
Patented July 1, 1958

2,841,191

LIQUID DISPENSING APPARATUS

John Fraser, Tolworth, Surbiton, England, assignor to Avery-Hardoll Limited, Chessington, England Application May 21, 1957, Serial No. 662,555

Claims priority, application Great Britain March 30, 1953

16 Claims. (Cl. 141—209)

This invention relates to liquid dispensing apparatus such as is used for supplying liquid fuel to the fuel tanks of motor vehicles. This application is a continuation-in-part of application Serial No. 419,513, filed March 29, 1954 which is now abandoned. The fuel is usually supplied through a "wet hose," that is, a hose which is always maintained full of liquid fuel, and a nozzle-and-valve unit termed a hosecock is mounted at the delivery end of the hose to control the delivery and to prevent leakage of liquid fuel from the hose when no delivery is taking place.

The object of the present invention is to provide a hosecock which is manually controllable to start, stop and control the rate of delivery of liquid fuel, and is also arranged to stop the delivery of fuel automatically if the receiving container is filled to a level sufficient to immerse the nozzle of the hosecock.

A hosecock according to the present invention comprises a main valve and pilot valve means controlling the operation of said main valve, the pilot valve means controlling an outlet from a control chamber to the downstream side of the main valve, and the control chamber having a restricted communication with the upstream side of the main valve, liquid pressure on the upstream side of the main valve acting in said control chamber, when the said outlet is closed, to provide a closing thrust on the upstream side of the main valve which is reduced by opening of the pilot valve means to permit opening of the said main valve by a smaller thrust exerted thereon at its downstream end by the liquid pressure on its upstream side and tending to open it, the pilot valve means comprising a manually operated pilot valve and a second pilot valve moved to close the outlet from the control chamber by suction arising when the flow of air, induced by the flow of liquid through the main valve in a pipe having its inlet in the nozzle of the hosecock, is obturated.

The second pilot valve is preferably movable between two positions, in both of which it closes the outlet from the control chamber, the said pilot valve being urged towards one of said positions by a spring acting in opposition to the suction force, and liquid pressure on the upstream side of the main valve tending to displace the said pilot valve from the position towards which it is urged by the spring.

The manually operable pilot valve is conveniently operated by means of a lever movable in a plane containing the axis of the main valve and extending into the control chamber through an opening in the side wall thereof.

The invention is hereinafter described with reference to the accompanying drawings, in which:

Figure 4 is a partial section on the line 4—4 of Figure 1;

Figure 6 is a section corresponding to a part of Figure 5 showing the position of the parts when liquid is flowing through the hosecock; and Figure 7 is a further section of the hosecock shown in Figure 5 when the flow has been automatically stopped.

Figure 1:
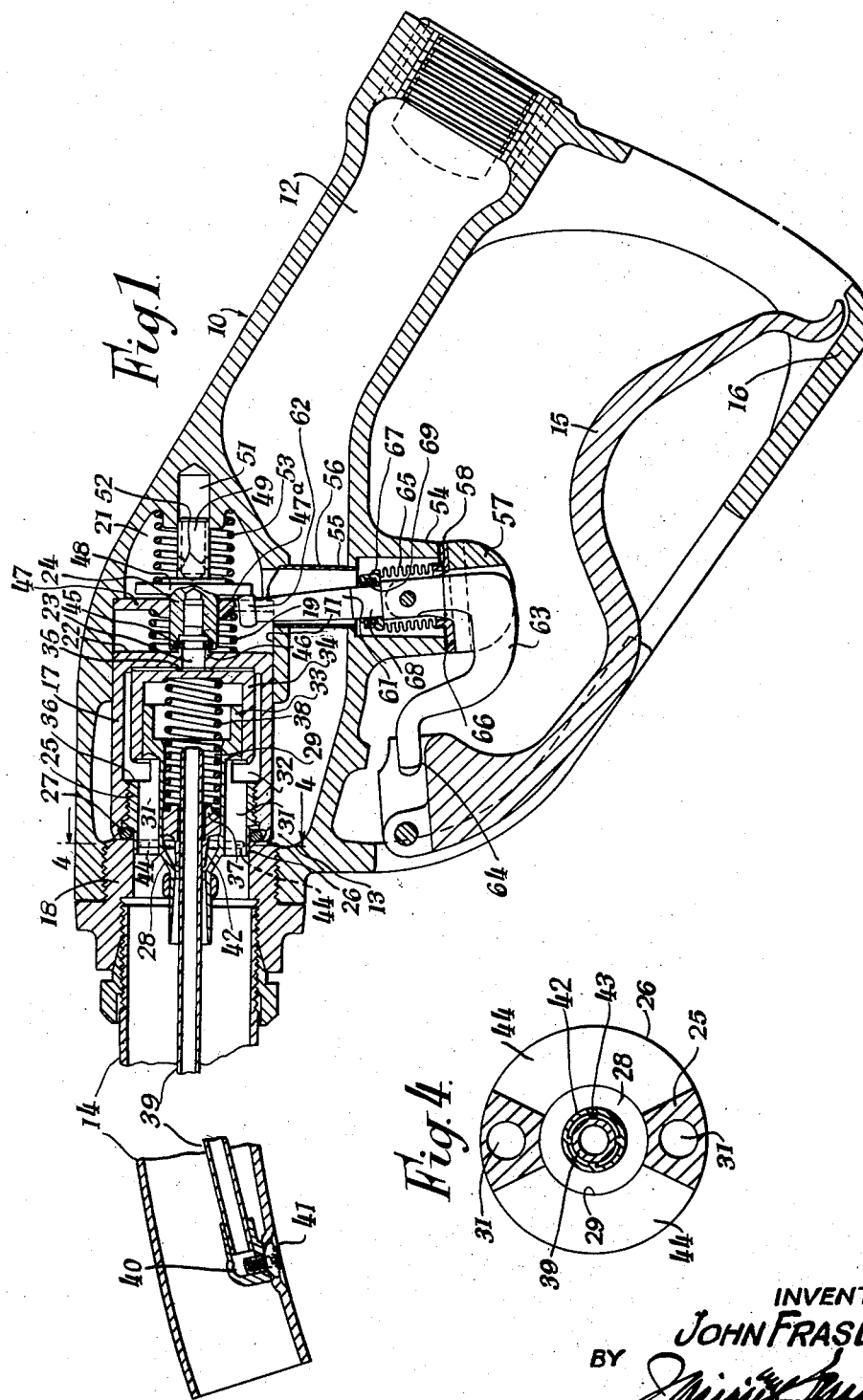
Figure 1 is a longitudinal section through one form of hosecock according to the invention, showing the position of the parts when no delivery of liquid is taking place.
Figure 2:
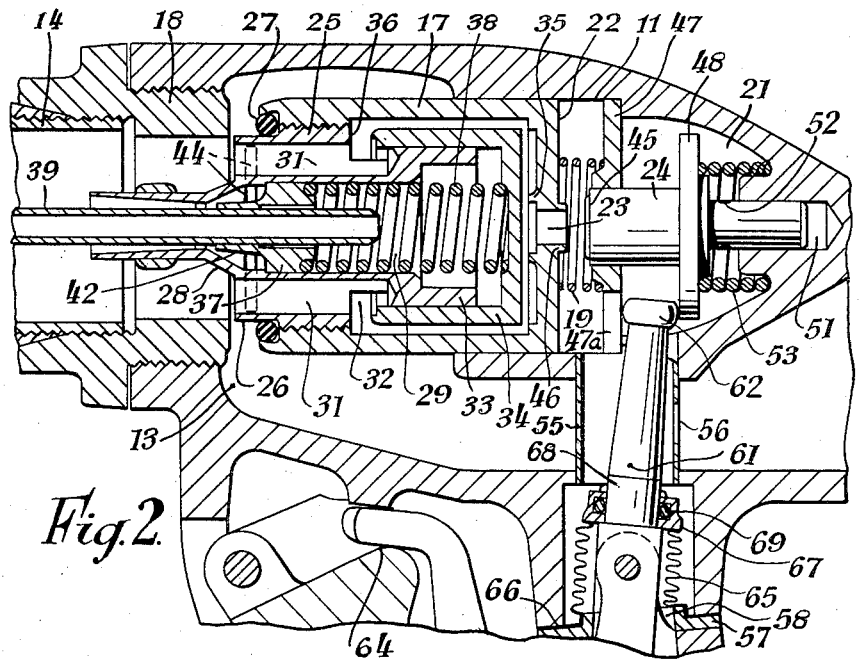
Figure 2 is a section similar to Figure 1 showing the postion of the parts when liquid is flowing through the hosecock.
Figure 3:
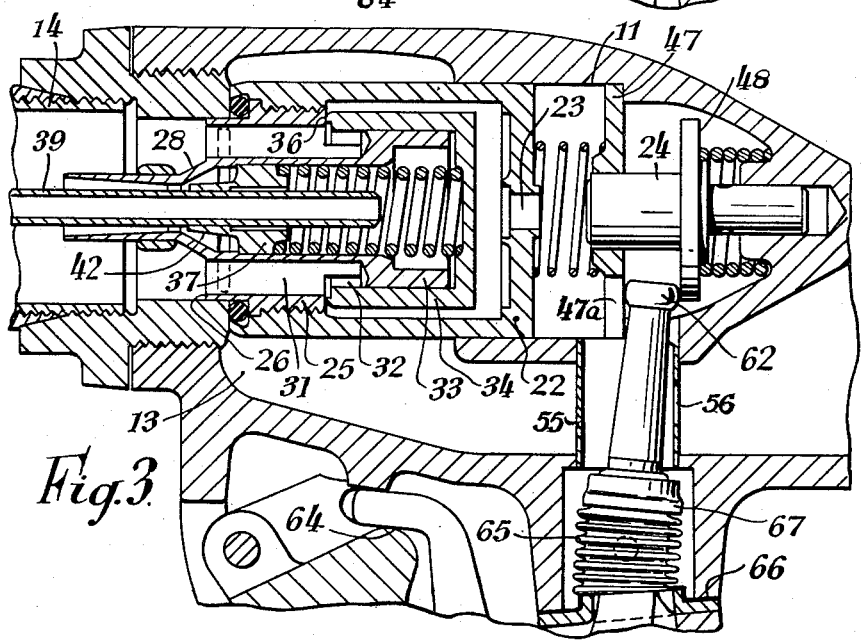
Figure 3 shows the position of the parts when flow has been automatically stopped.

Referring to Figures 1 to 4 of the drawings, the hosecock comprises a body 10 consisting of a metal casting having a blind bore 11 extending inwardly from one end, and a second bore 12, oblique to the bore 11, extending from the other end and leading to a lateral port 13 opening into the bore 11.

A tubular nozzle 14 extends from the open end of the blind bore 11, and the open end of the bore 12 is adapted to receive a screw-threaded connector (not shown) on a flexible hose of a liquid dispensing apparatus. An external lever 15 is pivotally attached to the body 10 adjacent the end thereof at which the nozzle 14 is mounted, the lever 15 extending alongside the body so as to be operated conveniently by a hand gripping the body. The usual guard 16 for the lever 15 is cast integral with the body.

The blind bore 11 accommodates the valve mechanism controlling the flow of liquid through the hosecock. The main valve of the valve mechanism comprises a hollow cylindrical main valve member 17 slidable in the bore 11 and adapted to engage an annular seat ring 18 at the open end of the said bore. The valve member 17 is urged towards the seat ring 18 by a light spring 19. The blind end of the bore 11 forms a control chamber 21 that is closed by the upstream end of the valve member 17 and has as hereinafter described, a somewhat restricted communication with the bore 12 in the body, the upstream end of the valve member 17 remote from the seat ring 18 being closed by a rigid diaphragm 22 formed with a central port 23 controlled by a pilot valve 24 operable, as hereinafter described, by the lever 15. The bore 12, port 13 and nozzle 14 constitute the main liquid passage through the hosecock, this passage being divided by the valve member 17 into an upstream portion in the bore 12 and a downstream portion in the nozzle 14.

The main valve member 17 is internally screw-threaded at its end adjacent the seat, to engage an external screw thread on an inner member 25. The member 25 is formed with an axially projecting portion 26, which, when the valve is seated, extends into the passage through the seat ring 18 with only a small annular clearance, and externally of the projecting portion 26, between it and a lip on the valve member 17, is mounted a packing ring 27 of round cross-section which engages the end surface of the seat ring 18 when the valve is closed. The diameter of the packing ring 27 is less than that of the valve member 17, so that there is an annular area of the valve member 17 outside the packing ring on which pressure of the liquid in the bore 12 or upstream portion of the main liquid passage exerts a thrust tending to open the valve member 17. From the end of the projecting portion 26 of the member 25 extends a venturi tube 28 leading into an axial passage 29 in the said member, and two diametrically opposite longitudinal passages 31 in the member 25 lead from the end of the projecting portion 26 to slots 32 opening into the interior of the valve member 17. A reduced portion 33 of the member 25 beyond the slots 32 forms a guide for a second pilot valve in the form of a cup-shaped wire member 34 slidable on the said reduced portion 33 between a position in which its base seats on a rim 35 around the port 23 to close that port, and a position in which its rim engages a shoulder 36 on the member 25 to close the passages 31 and slots 32. A plug 37 fixed in position in the axial passage 29 forms an abutment for a spring 38 urging the valve member 34 towards the diaphragm 22, the plug 37 having a central aperture through which extends, with a small clearance, a pipe 39, the pipe 39 passing through the venturi tube 28 and along the nozzle 14 to an elbow 40 one arm of which is secured by a tubular screw 41 to the wall of the nozzle adjacent its outlet end, the other end of the tube opening into the axial passage 29. The plug 37 has a tapered extension 42 extending to the throat of the venturi tube 28, the extension 42 being formed internally with longitudinal ribs 43 (Fig. 4) to locate the pipe 39 co-axially in the plug 37. Part-circumferential slots 44 are formed in the projecting portion 26 of the inner member 25, extending from its outer peripheral surface into the axial passage 29.

The valve 24 carries a round-section packing ring 45 which engages with a rim 46 around the port 23 to provide a fluid-tight closure of the port, and the said valve 24 is guided in an aperture in a disc 47 held against a shoulder in the chamber 21 by the spring 19. The valve 24 is flanged at 48, and a hollow stem 49 on the side of the flange 48 opposite to the packing ring 45 slides in a reduced extension 51 of the bore 11, communication being provided, through holes 52, between the reduced extension 51 of the bore 11 and the chamber 21 so that flow of liquid into and out of the extension 51 is not restricted. The valve 24 is urged towards its closed position by a spring 53 acting on the flange 48.

A boss 54 is formed on the body 10, the boss being hollow and its interior being connected by a tube 55, extending across the bore 12, to an opening in the side of the chamber 21, the tube 55 being secured in a fluid-tight manner to the walls of the bore 12 but being formed with a small opening 56 leading from the bore 12 into the said tube. A cap 57 formed with a pair of ears 58 is secured by screws to the end of the boss 54, with the ears 58 projecting into the interior of the boss. A lever 61 is pivotally mounted between the ears 58, the pivot being intermediate the ends of a straight portion of the lever, one end 62 of which extends through the tube 55 into the chamber 21 and engages the side of the flange 48 nearer to the main valve member 17. The disc 47 is slotted 47a to accommodate the end of the lever. The other end of the straight portion of the lever 61 projects outwardly of the boss 54 and from its extremity extends a double cranked portion 63 the free end of which engages a surface 64 on the lever 15, the arrangement being such that movement of the lever 15 towards the body 10 rocks the lever 61 to move the valve 24 off its seat. A flexible metal bellows 65 is secured at one end to a washer 66 clamped between the end of the boss 54 and the cap 57, the other end of the bellows being secured to a ring 67 which surrounds a cylindrical portion 68 of the lever 61 adjacent the inner end of the hollow in the boss, the ring 67 being grooved to receive a packing ring 69 making a fluid-tight joint with the portion 68 of the lever. The opening through which the lever 61 passes is thus closed in a fluid-tight manner without obstructing the angular movement of the lever.

The hosecock above described operates in the following manner.

The main cylindrical valve member 17 is urged by the spring 19 against the seat ring 18, and the valve member 24 is also urged by the spring 53 to close the port 23 in the main valve member 17. The cup-shaped valve member 34 also closes the port 23, being urged to the position in which it closes that port by the spring 38, which is strong enough to prevent the said valve member 34 from being moved off its seat by pressure due to the weight of fuel in the hose, so that the hose cannot be emptied by unseating the valve member 24 when the pump of the dispensing mechanism is inoperative.

If the pump of the dispensing mechanism is started up, pressure is built up in the hose, but, so long as the valve member 24 is seated, this pressure acts in the chamber 21 on the rigid diaphragm 22 and holds the valve member 17 on its seat.

The valve member 24 acts as a manually operated pilot valve, and, when lifted manually from its seat by operation of the lever 15, allows liquid fuel to flow through the port 23 from the chamber 21, the valve member 34 being forced off its seat around the port 23 by the pressure of this liquid. The flow of liquid through the port 23 is not sufficient to move the valve member 34 into engagement with the shoulder 36, so that the liquid flows through the slots 32 and passages 31 into the nozzle 14. The port 23 is of larger area than the port 56, so that the opening of the port 23 allows the pressure to fall in the control chamber 21, and the inlet pressure, acting on the annular area of the main valve member 17 around the packing ring 27 moves the said valve member away from the seat ring 18 to allow liquid fuel to flow through the port 13 and past the main valve member 17 into the nozzle. The point of maximum restriction of flow through the hosecock is between the end of the axially projecting portion 26 and the seating ring 18. The outer openings of the slots 44 are thus on the upstream side of the point of maximum restriction, so that there is a pressure drop across the venturi which ensures a continuous flow of liquid fuel, when the main valve is open, through the slots 44 and through the venturi 28. This flow draws air through the tubular screw 41 along the pipe 39 and through the annular space between the pipe 39 and the plug 37 to the throat of the venturi. Before the valve member 24 is unseated, the nozzle 14 is inserted into a receptacle to be filled, and when the said valve member is unseated, liquid fuel flows through the hosecock into the receptacle. If the liquid fuel in the receptacle rises to a level such that the tubular screw 41 is immersed, the flow of air up the pipe 39 is stopped, and suction is created in the axial passage 29 which acts in the cup-shaped valve member 34 and moves the rim thereof into engagement with the shoulder 36 on the inner member of the main valve, thus substantially closing the passages 31. Further escape of liquid from the control chamber 21 is thus substantially prevented, and liquid pressure builds up in that chamber to close the main valve 17 and shut off the flow of liquid fuel. The cup-shaped valve member 34 thus acts as an automatic pilot valve to control the closing of the main valve 17. The pilot valves 24 and 34 thus constitute pilot valve means that is manually operated to effect opening of the main valve 17 and automatically operated to effect closing of said main valve 17.

After the main valve has been closed automatically, the auxiliary pilot valve remains closed until the valve member 24 is allowed to return to its seat, preventing further liquid from passing through the port 23. Very slight leakage of liquid takes place between the valve member 34 and the seat 36, so that the pressure between the two pilot valves is reduced, and the valve member 34 moves away from the seat 36 under the influence of the spring 38.

The rate of delivery of liquid fuel is controlled by varying the position of the valve member 24, the main valve member 17 being urged constantly in the opening direction by the pressure of the fuel on its upstream side acting on the annular area around the packing ring 27 against a closing force determined by the pressure in the control chamber 21. The pressure in that chamber varies with the degree of opening of the valve member 24 since fuel from the upstream side of the main valve enters the chamber through the fixed-area port 56 and escapes at a rate depending upon the degree of opening of the said valve member 24. For a given position of the valve member 24, therefore, the main valve member 17 will move automatically to a position which the flow of fuel through the port 23 is sufficient to maintain a pressure in the control chamber which just balances the opening thrust on the main valve member. The main valve member 17 thus follows any movement of the valve member 24 with a consequent change in the main flow of liquid fuel.

If it is desired to stop the delivery of liquid fuel before the level in the receptacle is high enough to cause automatic cessation of flow, the valve member 24 is allowed to close the port 23, thus trapping liquid in the control chamber 21 to close the main valve.

Figure 5:
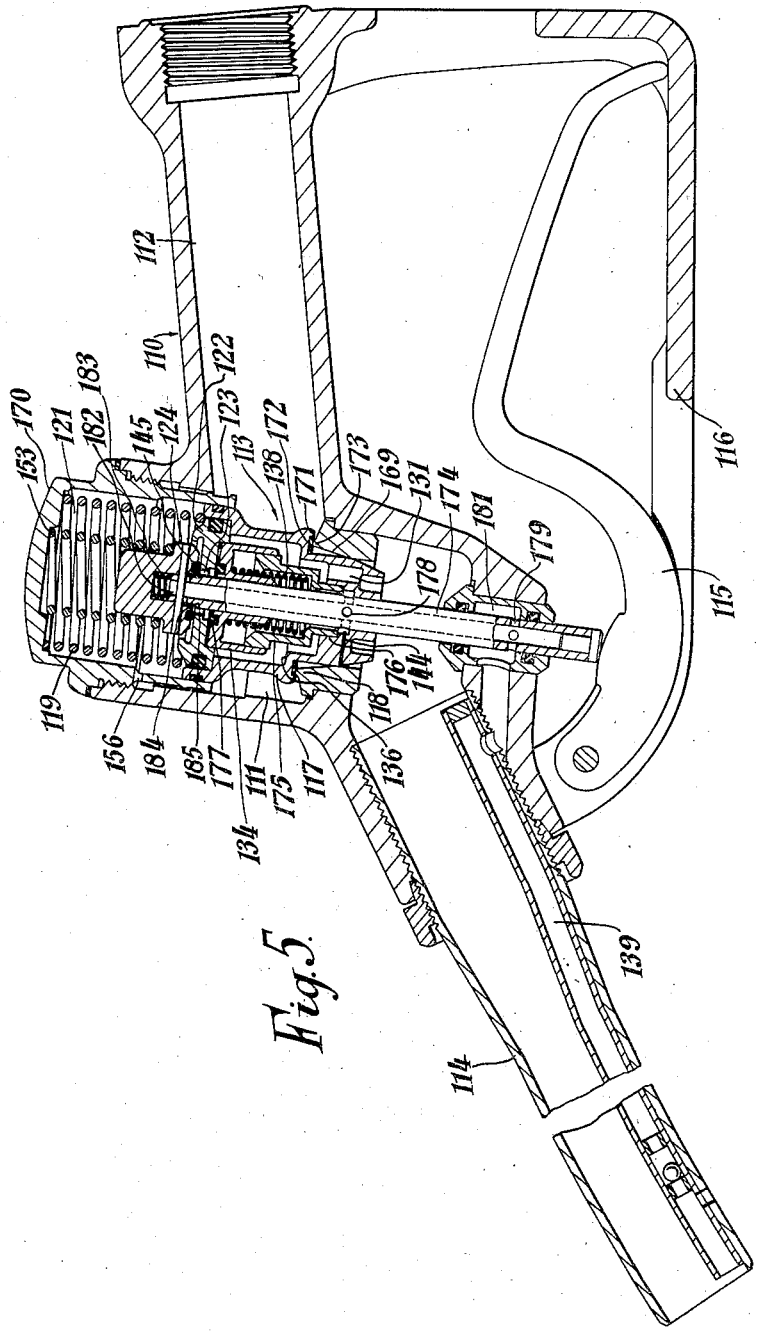
Figure 5 is a view similar to Figure 1 showing another form of hosecock according to the invention.

The hosecock shown in Figures 5 to 7 is similar in many respects to that shown in Figures 1 to 4, corresponding parts being indicated by similar reference numerals increased by 100 in each case. The hosecock comprises a body 110 consisting of a metal casting having a bore 111 therein to accommodate valve mechanism controlling the flow of fluid through the hosecock, a second bore 112 extending from one end of the casting and opening into the bore 111 at 113.

A tubular nozzle 114 is fitted into a socket in the body 110 so as to connect with one end of the bore 111, and the open end of the bore 112 is adapted to receive a screw-threaded connector (not shown) on a flexible hose of a liquid dispensing apparatus. An external lever 115 is pivotally attached to the body 110, the lever 115 extending alongside the body so as to be operated conveniently by a hand gripping the body. The usual guard 116 for the lever 115 is cast integral with the body.

The valve mechanism accommodated in the bore 111 comprises a hollow main valve member 117 slidable in the said bore and adapted to engage an annular seat ring 118 positioned in the bore 111 between the point where the bore 112 opens thereinto, and the nozzle 114. The valve member 117 is urged towards the seat ring 118 by a light spring 119. The bore 111 is closed at its end remote from the nozzle 114 by a cup-like screw cap 170 the interior of which forms a control chamber 121 closed by the upstream end of the valve member 117, the control chamber 121 having, as hereinafter described, a somewhat restricted communication with the bore 112 in the body. The said upstream end of the valve member 117 is closed by a rigid disc 122 formed with a central port 123 controlled by a pilot valve 124 operable, as hereinafter described, by the lever 115. The bore 112, port 113 and nozzle 114 constitute the main liquid passage through the hosecock, this passage being divided by the valve member 117 into an upstream portion in the bore 112 and a downstream portion in the nozzle 114.

The main valve member 117 is shouldered externally at 171, the shoulder being grooved to receive a ring 172 which engages an annular edge 173 on the seat ring 118 when the valve is closed, the portion of the valve member 117 on the downstream side of the shoulder 171, and the bore of the seat ring 118 through which it extends, being so shaped as to provide a convergent-divergent annular passage 169 between them which will function as a venturi. The diameter of the annular edge 173 is less than that of the valve member 117, so that there is an annular area of the valve member 117 outside the said edge on which the pressure of the liquid in the bore 112 or upstream portion of the main liquid passage exerts a thrust tending to open the valve member 117.

A stem 174 through which the lever 115 operates the pilot valve 124 extends co-axially through the main valve member 117, the downstream end of the valve member 117 being a close sliding fit on the stem 174 and being formed with passages of which one is shown at 131, connecting the interior of the valve member 117 to the downstream side of the valve member. A second pilot valve in the form of an inverted cup-shaped valve member 134 slidable on the stem 174 fits slidably over the larger upper end of a stepped sleeve 175 the smaller, lower end of which fits into a recess 176 in the downstream end of the valve member 117. The valve member 134 is slidable relative to the stem 174 and sleeve 175 between a position in which a packing ring 177 mounted on its base seats around the port 123 in the main valve member 117, and a position in which its rim engages an internal shoulder 136 in the valve member 117 to close the passages 131. A spring 138 interposed between the base of the valve member 134 and a shoulder in the sleeve 175 urges the valve member 134 towards the disc 122. The stem 174 is tubular, cross-bores 178 therein connecting the space enclosed by the sleeve 175 and the valve member 134 with the central bore of the stem, and the central bore is connected, by further cross bores 179, with an annular chamber 181 from which a pipe 139 extends along the nozzle 114 to the outer end of the latter. A passage 144 connects the space enclosed by the sleeve 175 and the valve member 134 with the passage 169 just downstream of the point of maximum constriction of the said passage.

The pilot valve 124 carries a round-section packing ring 145 which engages the disc 122 around the port 123 to provide a fluid-tight closure of the said port, and the pilot valve 124 is secured to the end of the stem 174 by a cross pin 182 engaging a short diametral slot in the stem 174. The pilot valve 124 is urged towards its seat on the disc 122 of the main valve member 117 by a relatively strong spring 153, and the pilot valve member 124 is urged away from the stem 174 by a spring 183 which tends to separate an edge 184 on the valve member 124 from an inclined shoulder 185 on the stem and thereby open a passage from the interior of the valve member 117 through clearance between the pilot valve 124 and the stem 174 into the bore of the stem 174, for a purpose hereinafter described.

The restricted communication between the control chamber 121 and the bore 112 is provided by an aperture 156 in the side wall of the cap 170.

The operation of the hosecock described with reference to Figures 5 to 7 is generally similar to the operation of that described with reference to Figures 1 to 4 but with some small differences which will be brought out by the following explanation.

The main valve member 117 is urged by the spring 119 against the seat ring 118, and the pilot valve 124 is also urged by the spring 153 to close the port 123 in the main valve member 117. The cup-shaped valve member 134 also closes the port 123, being urged to the position in which it closes that port by the spring 138, which is strong enough to prevent the said valve member 134 from being moved off its seat by pressure due to the weight of fuel in the hose, so that the hose cannot be emptied by unseating the pilot valve 124 when the pump of the dispensing mechanism is inoperative. The parts are shown in these positions in Figure 5, and it will be seen that the edge 184 on the pilot valve 124 is separated from the shoulder 185 on the stem 174.

When the pump of the dispensing mechanism is started, pressure is built up in the hose, but, so long as the pilot valve member 124 is seated, this pressure acts in the chamber 121 on the rigid disc 122 and holds the valve member 117 on its seat.

The pilot valve 124 acts as a manually operated pilot valve, and, when lifted manually from its seat by operation of the lever 115, allows liquid fuel to flow through the port 123 from the chamber 121, the valve member 134 being forced off its seat around the port 123 by the pressure of this liquid. The flow of liquid through the port 123 is not sufficient to move the valve member 134 into engagement with the shoulder 136, so that the liquid flows through the passages 131 into the nozzle 114. The port 123 is of larger area than the port 156, so that the opening of the port 123 allows the pressure to fall in the control chamber 121, and the pressure in the upstream portion of the main liquid passage, acting on the annular area of the main valve member 117 around the edge 173 moves the said valve member away from the seat ring 118 to allow liquid fuel to flow through the seat ring 118 into the nozzle 114. This position of the ports is shown in Figure 6. The convergent/divergent passage 169 produces a venturi action when liquid fuel flows through it so that suction is induced in the passage 144 which opens close to the throat of the passage 169. So long as the nozzle is clear of liquid in the vessel being filled, air can be drawn through the pipe 139 and the bore of the stem 174 to replace air drawn out by the suction, but if the liquid fuel in the vessel rises to a level at which the end of the nozzle 114 is immersed, the entry of air is stopped, and the suction induces a depression in the space enclosed by the sleeve 175 and valve member 134, causing the rim of the latter to move into engagement with the shoulder 136 and close the passages 131. Further escape of liquid from the control chamber 121 is thus prevented, and liquid pressure builds up in the control chamber to close the main valve 117 and shut off the flow of liquid fuel, as shown in Figure 7. The cup-shaped valve member 134 thus acts as an automatic pilot valve to control the closing of the main valve 117. The pilot valves 124 and 134 thus constitute pilot valve means that is manually operated to effect opening of the main valve 117 and automatically operated to effect closing of the said main valve 117.

It will be understood that the opening of the pilot valve 124 by the stem 174 causes seating of the edge 184 on the shoulder 185, so that the upper end of the bore in the stem 174 is closed. When the lever 115 is released, however, after delivery has been stopped, the edge 184 moves away from the shoulder 185, and liquid trapped around the cup-shaped valve member 134 can escape through the bore of the stem 174, allowing the said valve, member 134 to rise and re-seat itself around the port 123.

The rate of delivery of liquid fuel is controlled and the manual stopping of the flow of liquid is effected, in the same manner as in the previous embodiment.

I claim:

1. A liquid dispensing hosecock comprising a body and a nozzle jointly defining a main liquid passage, said body having a control chamber therein, a main valve seat in said main liquid passage, a main valve movably mounted between said control chamber and said main valve seat and dividing said main liquid passage into upstream and downstream portions, means providing communication between the up stream portion of said main liquid passage and said control chamber for admitting pressure liquid into said chamber for acting on the upstream end of said main valve to urge said main valve onto said main valve seat to close said main liquid passage, means providing a second passage between said control chamber and the downstream portion of said main liquid passage, pilot valve means controlling said second passage, manually operated means for opening said pilot valve means to relieve the pressure in the control chamber and allow opening of the main valve, and means for inducing suction by flow of liquid through the hosecock for closing said pilot valve means and cause and increase in pressure in said control chamber and consequent closure of said main valve.

2. A liquid dispensing hosecock comprising a body and a nozzle jointly defining a main liquid passage, said body having a control chamber therein, a main valve seat in said main liquid passage, a main valve movably mounted between said control chamber and said main valve seat and dividing said main liquid passage into upstream and downstream portions means providing communication between the upstream portion of said main liquid passage and said control chamber for admitting pressure liquid into said chamber for acting on the upstream end of said main valve to urge said main valve onto said main valve seat to close said main liquid passage, means providing a second passage between said control chamber and the downstream portion of said main liquid passage, pilot valve means controlling said second passage, said pilot valve means including a manually operated pilot valve which is opened to relieve pressure in the control chamber and so allow opening of the main valve, and a second pilot valve, and means for inducing suction by flow of liquid through the hosecock for urging said second pilot valve to a closed position, said suction-inducing means comprising a venturi, an air conduit in said nozzle and having its inlet end adjacent the nozzle tip and with its outlet end adjacent the throat of the venturi, whereby suction is induced in said conduit when its inlet end is obturated by liquid to close the second pilot valve and thereby close said second passage and cause an increase of pressure in said control chamber and consequent closure of said main valve.

3. A liquid dispensing hosecock according to claim 2 in which said second pilot valve comprises a closure member, first and second valve seats for said closure member, resilient means urging said closure member on to said first valve seat, said suction-inducing means urging the closure member on to said second valve seat, said first and second valve seats being engaged by opposite ends of the closure member and said closure member being displaced from the first valve seat by liquid flowing from the control chamber past said manually operated pilot valve.

4. A liquid dispensing hosecock comprising a control chamber, a main valve, a manually operated pilot valve within the control chamber for effecting the opening of the main valve, a second pilot valve for effecting the closing of the main valve, a venturi connecting with the second pilot valve so as to pass only a portion of the fluid flowing through the hosecock, and a flow restricting projection on one end of the main valve, said projection being located between the inlet and outlet from the venturi whereby a pressure drop is maintained across the venturi regardless of total flow through the main valve.

5. A hosecock according to claim 2 wherein the manually operable pilot valve is operated by means of a lever movable in a plane containing the axis of the main valve, said lever extending into the control chamber through an opening in the wall, the opening being rendered fluidtight by a flexible bellows surrounding the lever.

6. A liquid dispensing hosecock according to claim 4, wherein the main valve is of cylindrical shape slidable in a valve accommodation bore, a seat at the end of said bore adjacent the nozzle upon which the said main valve engages to stop the flow of liquid fuel through the nozzle; said bore forming a part of the control chamber at the opposite end of the main valve, whereby said valve constitutes the main flow controlling valve for the hosecock and when closed prevents any flow through the hosecock.

7. A liquid dispensing hosecock comprising a control chamber, a main valve, manually operated means within the control chamber for effecting the opening of the main valve, a pilot valve for effecting the closing of the main valve, a venturi connecting with the pilot valve so as to pass only a portion of the fluid flowing through the hosecock, a flow restricting projection at one end of the main valve located between the inlet and outlet of the venturi to maintain a pressure drop across the venturi regardless of total flow through the main valve; said main valve being of cylindrical shape slidable in a valve accommodation bore, and a seat at the end of said bore adjacent the nozzle upon which the main valve engages to stop the flow of fluid through the nozzle; said bore forming a part of the control chamber at the opposite end of the main valve, whereby said main valve constitutes the main flow controlling means for the hosecock and when closed prevents any flow through the hosecock.

8. A liquid dispensing hosecock comprising a control chamber, a main valve, manually operated means within the control chamber for effecting the opening of the main valve, a pilot valve for effecting the closing of the main valve, a venturi connecting with the pilot valve so as to pass only a portion of the fluid flowing through the hosecock; said main valve being provided with a cylindrical portion extending beyond the seat engaging portion of said main valve and having a snug fit in the passage within the seat; said cylindrical portion having a slot in communication with the inlet of said venturi to supply liquid to said venturi at all times when said main valve is unseated; said main valve being of cylindrical shape slidable in a valve accommodation bore, and a seat at the end of said bore adjacent the nozzle upon which the main valve engages to stop the flow of fluid through the nozzle; said bore forming a part of the control chamber at the opposite end of the main valve, whereby said main valve constitutes the main flow controlling means for the hosecock and when closed prevents any flow through the hosecock.

9. A liquid dispensing hosecock comprising a control chamber, a main valve, manually operated means within the control chamber for effecting the opening of the main valve, a pilot valve for effecting the closing of the main valve, a venturi connecting with the pilot valve so as to pass only a portion of the fluid flowing through the hosecock, means to insure a partial flow through the venturi by a pressure drop across the place of maximum restriction in the venturi regardless of the total flow through the main valve, said main valve being of cylindrical shape slidable in a valve accommodation bore, and a seat at the end of said bore adjacent the nozzle upon which the main valve engages to stop the flow of fluid through the nozzle, said bore forming a part of the control chamber at the opposite end of the main valve, whereby said main valve constitutes the main flow controlling means for the hosecock and when closed prevents any flow through the hosecock.

10. In a liquid dispensing hosecock comprising a body having a main liquid passage therethrough, a main valve seat surrounding said main liquid passage, a main valve mounted in said body for movement relative to said main valve seat for closing or opening said main liquid passage, manually operable means in said body for effecting the opening movement of said main valve away from said main valve seat, and pilot valve means disposed in said passage, and vent means to be closed by dispensed liquid and effect closing of said pilot valve means, the improvement comprising means operated by said pilot valve means for closing said main valve upon closing of said pilot valve means.

11. A liquid dispensing hosecock comprising a body and a nozzle jointly defining a main liquid passage, said body having a control chamber therein, a main valve seat in said main liquid passage, a main valve movably mounted between said control chamber and said main valve seat and dividing said main liquid passage into upstream and downstream portions, means providing communication between the upstream portion of said main liquid passage and said control chamber for admitting pressure liquid into said chamber for acting on the upstream end of said main valve to urge said main valve onto said main valve seat to close said main liquid passage, means providing a second passage between said control chamber and the downstream portion of said main liquid passage, pilot valve means controlling said second passage, said pilot valve means including a manually operated pilot valve which is opened to relieve pressure in the control chamber and so allow opening of the main valve, and a second pilot valve, and means for inducing suction by flow of liquid through the hosecock for urging said second pilot valve to a closed position and causing an increase of pressure in said control chamber and consequent closure of said main valve.

12. A liquid dispensing hosecock according to claim 11 in which said second pilot valve comprises a closure member, first and second valve seats for said closure member, resilient means urging said closure member onto said first valve seat, said suction-inducing means urging the closure member onto said second valve seat, said first and second valve seats being engaged by opposite ends of the closure member and said closure member being displaced from the first valve seat by liquid flowing from the control chamber past said manually operated pilot valve.

13. A liquid dispensing hosecock comprising a body and a nozzle jointly defining a main liquid passage, said body having a control chamber therein, a main valve seat in said main liquid passage, a main valve movably mounted between said control chamber and said main valve seat and dividing said main liquid passage into upstream and downstream portions, means providing communication between the upstream portion of said main liquid passage and said control chamber for admitting pressure liquid into said chamber for acting on the upstream end of said main valve to urge said main valve onto said main valve seat to close said main liquid passage, means providing a second passage between said control chamber and the downstream portion of said main liquid passage, pilot valve means controlling said second passage, manually operated means for opening said pilot valve means to relieve the pressure in the control chamber and allow opening of the main valve, and means for inducing a suction by flow of liquid through the hosecock for closing said pilot valve means, said suction-inducing means comprising a venturi, an air conduit in said nozzle and having its inlet end adjacent the nozzle tip and with its outlet end adjacent the throat of the venturi, whereby suction is induced in said conduit when its inlet end is obturated by liquid to close said pilot valve means and thereby close said second passage and cause an increase of pressure in said control chamber and consequent closure of said main valve.

14. A liquid dispensing hosecock comprising a body and a nozzle jointly defining a main liquid passage, a valve accommodation bore, said main liquid passage comprising an upstream portion opening laterally into said valve accommodation bore and a downstream portion extending from a main valve seat at one end of said valve accommodation bore, a main valve movably mounted in said valve accommodation bore to engage said seat and separate the upstream and downstream portions of the main liquid passage, a control chamber in said valve accommodation bore at the end thereof remote from the main valve seat means providing communication between said control chamber and the upstream portion of the main liquid passage, said main valve member forming a wall of said control chamber and being urged towards the main valve seat by liquid pressure therein, a second passage between the control chamber and the downstream portion of the main liquid passage manually operated means in the control chamber for releasing pressure therein to effect the opening of the main valve, a pilot valve for effecting the closing of the said second passage, a venturi in said main liquid passage and means for inducing suction by flow of liquid through the venturi for closing said pilot valve and thereby causing closure of the main valve.

15. A liquid dispensing hosecock according to claim 14 in which the main valve seat is formed on a seat ring and the main valve has a portion extending into the bore of the seat ring, the bore of the seat ring and the said portion of the main valve being shaped to provide between them at all relative positions of the said valve and seat ring a convergent/divergent annular passage constituting the venturi.

16. A liquid dispensing hosecock according to claim 14 in which a stem extends co-axially through the main valve and is operable to open the manually operated pilot valve, a lever being movably mounted on the body in a plane containing the axis of the main valve and the stem having one end thereof in engagement with the lever.

References Cited in the file of this patent

UNITED STATES PATENTS 2,445,524   Grise ------------------ July 20, 1948